US012663638B2

(12) United States Patent
Bao et al.

(10) Patent No.: US 12,663,638 B2
(45) Date of Patent: Jun. 23, 2026

(54) METHOD OF WAVENUMBER LINEARITY DISPERSION OPTICAL SYSTEM AND IMAGING SPECTROMETER

(71) Applicant: SOOCHOW UNIVERSITY, Suzhou (CN)

(72) Inventors: Jian Bao, Suzhou (CN); Qiuyang Shen, Suzhou (CN); Xinhua Chen, Suzhou (CN); Weimin Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 1133 days.

(21) Appl. No.: 17/760,583

(22) PCT Filed: Dec. 19, 2020

(86) PCT No.: PCT/CN2020/137811
§ 371 (c)(1),
(2) Date: Mar. 15, 2022

(87) PCT Pub. No.: WO2022/095237
PCT Pub. Date: May 12, 2022

(65) Prior Publication Data
US 2023/0314795 A1 Oct. 5, 2023

(30) Foreign Application Priority Data
Nov. 9, 2020 (CN) .......................... 202011240668.5

(51) Int. Cl.
*G02B 27/00* (2006.01)
*G01J 3/12* (2006.01)
(Continued)

(52) U.S. Cl.
CPC ............ *G02B 27/0012* (2013.01); *G01J 3/14* (2013.01); *G01J 3/18* (2013.01); *G01J 3/2823* (2013.01); *G01J 2003/1208* (2013.01)

(58) Field of Classification Search
CPC . G02B 27/0012; G01J 3/14; G01J 3/18; G01J 3/2823; G01J 2003/1208; G01J 3/0297
See application file for complete search history.

(56) References Cited

U.S. PATENT DOCUMENTS

| | | | | |
|---|---|---|---|---|
| 2003/0142414 A1* | 7/2003 | Sugi | ........................ | G11B 7/139 |
| 2006/0087725 A1* | 4/2006 | Arriola | ............... | G03F 7/70966 |
| | | | | 359/357 |
| 2014/0268038 A1 | 9/2014 | Schmoll | | |

FOREIGN PATENT DOCUMENTS

| | | |
|---|---|---|
| CN | 102969651 A | 3/2013 |
| CN | 103398732 A | 11/2013 |

(Continued)

OTHER PUBLICATIONS

Jiang, Xiaoyun, et al. "Measuring and compensating for ocular longitudinal chromatic aberration." Optica 6.8 (2019): 981-990. (Year : 2019).*

(Continued)

*Primary Examiner* — Saif A Alhija
(74) *Attorney, Agent, or Firm* — SZDC Law PC

(57) ABSTRACT

The invention discloses a design method of a wavenumber linearity dispersion optical system and an imaging spectrometer, including: building an optical system including a grating, a prism and an objective lens that are sequentially arranged, the grating adjoins the prism; defining a linearity evaluation coefficient RMS; assigning a minimum value to the linearity evaluation coefficient RMS through adjustment to the vertex angle of the prism, when the linearity evaluation coefficient RMS is at minimum, the vertex angle of the prism being $\alpha_1$; acquiring compensations for distortion and (Continued)

longitudinal chromatic aberration of the objective lens based on the interval between equal-difference wavenumbers on the image plane when the vertex angle of the prism is $\alpha_1$; and optimizing the objective lens based on the compensations for distortion and longitudinal chromatic aberration of the objective lens to obtain an optimized optical system. Higher wavenumber linearity can be achieved through objective-lens-aberration compensated wavenumber linearity.

10 Claims, 6 Drawing Sheets

(51) Int. Cl.
| | |
|---|---|
| G01J 3/14 | (2006.01) |
| G01J 3/18 | (2006.01) |
| G01J 3/28 | (2006.01) |

(56) References Cited

FOREIGN PATENT DOCUMENTS

| CN | 104765085 A | 7/2015 |
|---|---|---|
| CN | 109157187 A | 1/2019 |

OTHER PUBLICATIONS

Volkova, M. A., et al. "Software compensation of chromatic-aberration effects on color photographs." Journal of Optical Technology 86.12 (2019): 763-768. (Year: 2019).*

Gongpu Lan et al., "Design of a kspace spectrometer for ultrabroad waveband spectral domain optical coherence tomography" Scientific Report, 7:42353, Mar. 7, 2017, pp. 1-8.

\* cited by examiner

METHOD OF WAVENUMBER LINEARITY DISPERSION OPTICAL SYSTEM AND IMAGING SPECTROMETER

This application is the National Stage Application of PCT/CN2020/137811, filed on Dec. 19, 2020, which claims priority to Chinese Patent Application No. 202011240668.5, filed on Nov. 9, 2020, which is incorporated by reference for all purposes as if fully set forth herein.

FIELD OF THE INVENTION

The present invention relates to the technical field of spectrometers, and more particularly to a design method of a wavenumber linearity dispersion optical system and an imaging spectrometer.

DESCRIPTION OF THE RELATED ART

In spectral-domain optical coherence chromatography systems, the linear distribution of wavenumbers achieved by the spectrometer system can not only significantly reduce the interpolation error of the image to improve the image quality, but also improve the imaging speed and sensitivity of the system. The near-linear distribution of wavenumbers was first obtained by Traub in 1990 by using a grism structure, but its linearity was not high. In 2007 Hu achieved linear wavenumber distribution with higher linearity by separating the grating from the prism and introduced it into the spectral-domain optical coherence chromatography system.

Currently, there are three main optical methods to achieve high wavenumber linearity. In the first method, it is obtained by the combination of grating and prism and optimization based on variables including the slot density of the grating, the included angle between the grating and the prism, the vertex angle of the prism, and the material of the prism to achieve linear distribution of wavenumbers. However, the disadvantage of using only the combination of grating and prism for beam splitting to achieve linear wavenumber distribution is that the grating and the prism should have a particular included angle therebetween to obtain highly linear distribution, which increases the size of the system and the difficulty in assembly and adjustment. In the second method, linear wavenumber distribution is achieved through joint beam splitting by two gratings and optimization based on variables including the slot density of the grating and the included angle between the gratings. However, joint beam splitting by two gratings leads to low energy utilization. In the third method, free-form surfaces are introduced based on the combination of the prism and the grating to achieve wavenumber distribution with higher linearity. However, the introduction of free-form surfaces leads to excessively high cost.

SUMMARY OF THE INVENTION

The present invention aims to overcome the technical problems in existing optical systems allowing high wavenumber linearity of a complicated structure, large size, low energy utilization and high cost.

To overcome the technical problems mentioned above, the present invention provides a design method of a wavenumber linearity dispersion optical system including the following steps.

S1: building an optical system including a grating, a prism and an objective lens that are sequentially arranged, the grating adjoining the prism. Collimated light is split through the grating and the prism into rays of different wavenumbers, and rays of different wavenumbers enter the objective lens at different angles and image on an image plane.

S2: defining a linearity evaluation coefficient RMS, which is the root-mean-square error of intervals between equal-difference wavenumbers in an operating band on the image plane.

S3: assuming the length of the image plane Y as a constant value, assigning a minimum value to the linearity evaluation coefficient RMS through adjustment to the vertex angle $\alpha$ of the prism. When the linearity evaluation coefficient RMS is at minimum, the vertex angle of the prism is $\alpha_1$.

S4: acquiring compensations for distortion and longitudinal chromatic aberration of the objective lens based on the location interval between the equal-difference wavenumbers on the image plane when the vertex angle of the prism is $\alpha_1$.

S5: optimizing the objective lens based on the compensations for distortion and longitudinal chromatic aberration of the objective lens to obtain an optimized optical system.

Preferably, between the steps S4 and S5 the method further includes designing an objective lens in which negative distortion and longitudinal chromatic aberration can be introduced.

Preferably, the objective lens includes a first positive lens, a first negative lens, a second positive lens and a third positive lens that are sequentially arranged. The incident height and incident angle of an off-axis view field chief ray on the third positive lens are increased to produce negative spherical aberration in order to introduce negative distortion.

Preferably, a second negative lens is further provided at the side of the third positive lens far away from the second positive lens to correct the field curvature.

Preferably, the first positive lens, the first negative lens, the second positive lens, the third positive lens and the second negative lens are made of the same material to introduce longitudinal chromatic aberration.

Preferably, the first positive lens, the first negative lens, the second positive lens, the third positive lens and the second negative lens have a refractive index in the range of 1.5 to 2.3.

Preferably, the step S5 includes optimizing the optical system by changing the curvature of the objective lens, the interval between adjacent lenses, the thickness of the lens, and the material of the lens.

Preferably, the step S2 includes specifically the following steps.

S21: selecting a number n of equal-difference wavenumbers from the operating band.

S22: assuming the incident angle of a collimated ray on the grating as $\theta_{in}$, the diffraction angle as $\theta_d$, the included angle between the grating and the prism as $\beta$, the vertex angle of the prism as $\alpha$, the incident angles of the ray on the front and back surfaces of the prism respectively as $\theta_1$ and $\theta_3$ and the corresponding exit angles respectively as $\theta_2$ and $\theta$, the refractive index of the prism as $n(\lambda)$, and the exit angle of the center wavenumber $$k_{\frac{n+1}{2}}$$

on the back surface of the prism as $$\theta_{k_{\frac{n+1}{2}}},$$

with its exit direction as the optical axis direction of the objective lens, and based on the geometrical relationship, the grating equation and the law of refraction, obtaining:

$$\sin\theta_2 = \frac{\sin\left[\beta + \arcsin\left(\frac{\lambda}{d} - \sin\theta_{in}\right)\right]}{n(\lambda)} \tag{1}$$

$$\sin\theta = n(\lambda)\sin\theta_3, \tag{2}$$

where d is the grating constant, $\lambda = 2\pi/k$ is the wavelength of the light, $\beta = \theta_1 - \theta_d$, and $\theta_3 = \alpha - \theta_2$.

S23: combining equation (1) with equation (2) and obtaining the exit angle of the ray on the back surface of the prism as:

$$\theta = \arcsin\left\{n(\lambda)\cdot\sin\left\{\alpha - \arcsin\left\{\frac{\sin\left\{\arcsin\left(\frac{\lambda}{d} - \sin\theta_{in}\right) + \beta\right\}}{n(\lambda)}\right\}\right\}\right\}; \tag{3}$$

and based on the paraxial relationship, obtaining the focal length of the objective lens as:

$$f = \frac{Y}{\left|\tan\left(\Delta\theta_{k_n}\right)\right| + \left|\tan\left(\Delta\theta_{k_1}\right)\right|}, \tag{4}$$

where Y is the length of the image plane, $$\Delta\theta_{kn} = \theta_{k_{\frac{n+1}{2}}} - \theta_{k_n}$$

is the view field angle at which the ray of wavenumber $k_n$ enters the objective lens, and $$\Delta\theta_{k_1} = \theta_{k_1} - \theta_{k_{\frac{n+1}{2}}}$$

is the view field angle at which the ray of wavenumber $k_1$ enters the objective lens.

S24: defining a linearity evaluation coefficient $R_{MS}$:

$$R_{MS} = \sqrt{\frac{\sum_{i=1}^{n}\left(\Delta y_{k_i} - \overline{y_k}\right)^2}{n-1}}, \tag{5}$$

where $\Delta y_{k_i} = y_{k_i} - y_{k_{i+1}}$ is the interval between adjacent wavenumbers on the image plane, $y_{k_i} = f \cdot \tan(\Delta\theta_{k_i})$ is the y coordinate of the plane, i-th wavenumber on the image plane, and $\overline{y_k} = (y_{k_1} - y_{k_n})/(n-1)$ is the average interval between equal-difference wavenumbers on the image plane.

Preferably, in the step S4, the compensation for distortion of the objective lens is $$D = \frac{\frac{n-1}{2} \times \frac{\left(\frac{\Delta y_{k_{\frac{n-1}{2}}} + \Delta y_{k_{\frac{n+1}{2}}}}{2}\right)}{2} - \frac{\left(y_{k_1} + \left|y_{k_n}\right|\right)}{2}}{\frac{\left(y_{k_1} + \left|y_{k_n}\right|\right)}{2}},$$

and the compensation for longitudinal chromatic aberration of the objective lens is $C = y_{k_1} - |y_{k_n}|$.

The present invention further discloses an imaging spectrometer that is fabricated by the design method of a wavenumber linearity dispersion optical system described above.

The present invention has the following beneficial effects.

1. According to the design conception of objective-lens-aberration compensated wavenumber linearity as proposed by the present invention, the wavenumber linearity of the spectrometer can be further increased by means of the design of the objective lens.

2. In the present invention, higher wavenumber linearity can be achieved through compensation for aberration of the objective lens without separating the grating from the prism than the case where the grating is separated from the prism, while the size of the beam splitting structure is reduced.

3. In the present invention, the optical system has high energy utilization, wide application and low cost.

Figure 1:
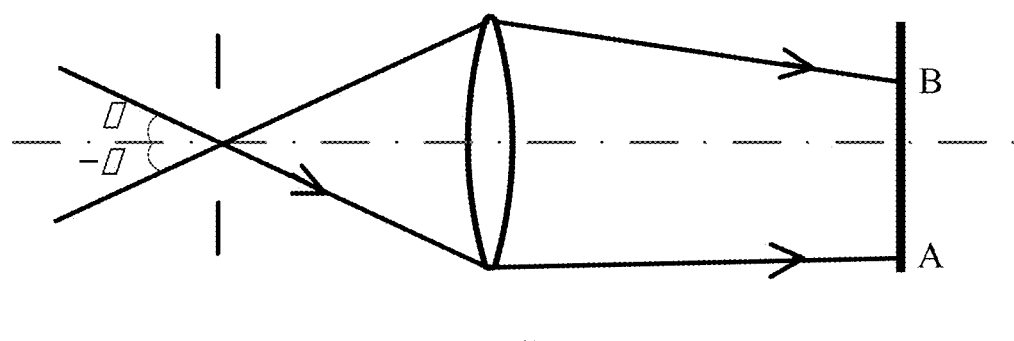
FIG. 1 is a schematic view of an optical path of an objective lens.

REFERENCE NUMBERS IN THE DRAWINGS 10 grating,
11 front protective glass of the grating,
12 back protective glass of the grating,
20 prism,
30 objective lens,
31 first positive lens,
32 first negative lens,
33 second positive lens,
34 third positive lens,
35 second negative lens,
40 image plane,
50 collimating lens.

DETAILED DESCRIPTION OF THE PREFERRED EMBODIMENTS

The invention will be further illustrated with reference to the drawings and particular embodiments, so that those skilled in the art can better understand and implement the present invention, but the listed embodiments are intended as limitations of the present invention.

To achieve miniaturization of the wavenumber linearity spectrometer and increase the wavenumber linearity, in the present invention, objective-lens-aberration compensated wavenumber linearity is utilized to achieve higher wavenumber linearity without separating the grating from the prism. The basic principle is as follows. After the collimated light is split by a beam splitting element, rays of different wavenumbers enter the objective lens at different angles. As shown in FIG. 1, which is the view of the optical path of objective-lens-aberration compensated wavenumber, in which the direction of the optical axis is the direction of the center wavenumber ray. If the rays of the smallest wavenumber and the greatest wavenumber are incident respectively at the angles $\omega$ and $-\omega$, they intersect the Gaussian image plane at the spots A and B. As the material of the objective lens has different refractive indices for different wavenumbers and the greater the wavenumber, the greater the refractive index, the spot A is at a greater distance from the optical axis than the spot B. Therefore, when the total length of the image plane is set to a constant value, adjusting the focal length of the objective lens in the spectrometer so that the objective lens produces longitudinal chromatic aberration makes the image point for the greater wavenumber closer to the optical axis and the image point for the smaller wavenumber farther away from the optical axis. Distortion in the optical system includes negative distortion and positive distortion. The negative distortion means that the height of the intersection between the chief ray and the Gaussian image plane becomes lower than the ideal image height with the enlargement of the view field. The positive distortion means that the height of the intersection between the chief ray and the Gaussian image plane becomes greater than the ideal image height with the enlargement of the view field. When the length of the image plane is set to a constant value, the focal length of the objective lens in the spectrometer is adjusted so that the objective lens produces negative (positive) distortion, making the wavenumber image point at the center of the image plane farther away from (closer to) the optical axis, and the wavenumber image point on the border of the image plane closer to (farther away from) the optical axis. As such, aberration produced by the objective lens can improve distribution of the wavenumbers on the image plane.

Figure 2:
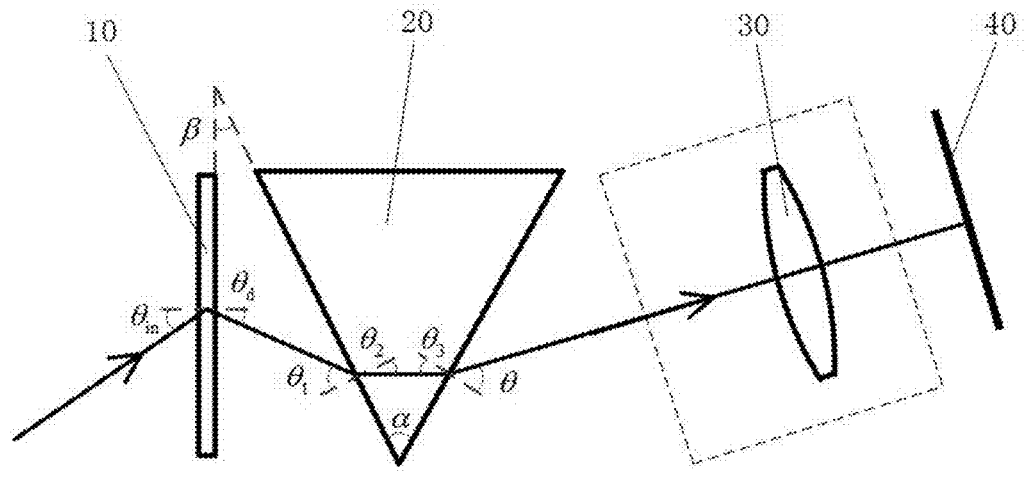
FIG. 2 is a schematic view of a wavenumber linearity design.

As shown in FIG. 2, the present invention discloses a design method of wavenumber linearity dispersion optical system that includes the following steps.

First step: building an optical system including a grating 10, a prism 20 and an objective lens 30 that are sequentially arranged, wherein the grating 10 adjoins the prism 20. That is, the included angle $\beta$ between the grating and the prism is 0. Collimated light is split through the grating 10 and the prism 20 into rays of different wavenumbers, and rays of different wavenumbers enter the objective lens 30 at different angles and image on an image plane 40.

Second step: defining a linearity evaluation coefficient RMS, which is the root-mean-square error of intervals between equal-difference wavenumbers in an operating band on the image plane, this step includes specifically the following steps.

S21: selecting n equal-difference wavenumbers from the operating band.

S22: assuming the incident angle of a collimated ray on the grating as $\theta_{in}$, the diffraction angle as $\theta_d$, the included angle between the grating and the prism as $\beta$, the vertex angle of the prism as $\alpha$, the incident angles of the ray on the front and back surfaces of the prism respectively as $\theta_1$ and $\theta_3$ and the corresponding exit angles respectively as $\theta_2$ and $\theta$, the refractive index of the prism as $n(\lambda)$, and the exit angle of the center wavenumber $$k_{\frac{n+1}{2}}$$

on the back surface or the prism as $$\theta_{k_{\frac{n+1}{2}}},$$

with its exit direction as the optical axis direction of the objective lens, and based on the geometrical relationship, the grating equation and the law of refraction, obtaining:

$$\sin\theta_2 = \frac{\sin\left[\beta + \arcsin\left(\frac{\lambda}{d} - \sin\theta_{in}\right)\right]}{n(\lambda)}, \tag{1}$$

$$\sin\theta = n(\lambda)\sin\theta_3, \tag{2}$$

where d is the grating constant, $\lambda = 2\pi/k$ is the wavelength of the light, $\beta = \theta_1 - \theta_d$, and $\theta_3 = \alpha - \theta_2$.

S23: combining equation (1) with equation (2) and obtaining the exit angle of the ray on the back surface of the prism as:

$$\theta = \arcsin\left\{n(\lambda) \cdot \sin\left\{\alpha - \arcsin\left(\frac{\sin\left\{\arcsin\left(\frac{\lambda}{d} - \sin\theta_{in}\right) + \beta\right\}}{n(\lambda)}\right)\right\}\right\}; \tag{3}$$

and based on the paraxial relationship, obtaining the focal length of the objective lens as:

$$f = \frac{Y}{\left|\tan(\Delta\theta_{k_n})\right| + \left|\tan(\Delta\theta_{k_1})\right|}, \tag{4}$$

where Y is the length of the image plane, $$\Delta\theta_{kn} = \theta_{k_{\frac{n+1}{2}}} - \theta_{kn}$$

is the view field angle at which the ray of wavenumber $k_n$ enters the objective lens, and $$\Delta\theta_{k_1} = \theta_{k_1} - \theta_{k_{\frac{n+1}{2}}}$$

is the view field angle at which the ray of wavenumber $k_1$ enters the objective lens.

S24: defining a linearity evaluation coefficient $R_{MS}$:

$$R_{MS} = \sqrt{\frac{\sum_{i=1}^{n}(\Delta y_{k_i} - \overline{y_k})^2}{n-1}}, \qquad (5)$$

where $\Delta y_{k_i} = -y_{k_{i+1}}$ is the interval between adjacent wavenumber on the image plane, $y_{k_1} = f \cdot tan(\Delta\theta_k)$ is the y coordinate of the i-th wavenumber on the image plane, and $\overline{y_k} = (y_{k_1} - y_{k_n})/(n-1)$ is the average interval between equal-difference wavenumbers on the image plane. As such, a curve of $R_{MS}$ varying in function of $\beta$ and $\alpha$ is obtained. When $\beta$ is 0, the prism adjoins the prism.

S3: assuming the length of the image plane Y as a constant value, assigning a minimum value to the linearity evaluation coefficient RMS through adjustment to the vertex angle $\alpha$ of the prism. When the linearity evaluation coefficient RMS is at minimum, the vertex angle of the prism is $\alpha_1$.

S4: acquiring compensations for distortion and longitudinal chromatic aberration of the objective lens based on the location interval between equal-difference wavenumbers on the image plane when the vertex angle of the prism is $\alpha_1$, including specifically:

the compensation for distortion of the objective lens $$D = \frac{\frac{n-1}{2} \times \frac{\left(\frac{\Delta y_{k_{\frac{n-1}{2}}} + \Delta y_{k_{\frac{n+1}{2}}}}{2}\right)}{2} - \frac{(y_{k_1} + |y_{k_n}|)}{2}}{\frac{(y_{k_1} + |y_{k_n}|)}{2}},$$

and the compensation for longitudinal chromatic aberration of the objective lens $C = y_{k_1} - |y_{k_n}|$.

In the present invention, the structure of the objective lens can be designed to introduce negative distortion and longitudinal chromatic aberration. The objective lens may include a combination of multiple lenses.

Figures 5, 6:
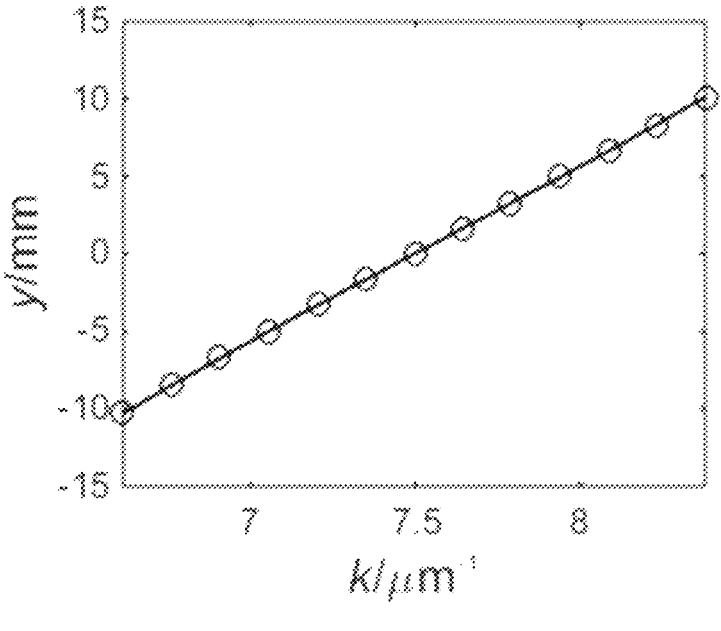
FIG. 5 shows a curve of image height varying in function of a wavenumber prior to aberration compensation.
FIG. 6 is a sectional view of a wavenumber linearity optical system.

With reference to FIG. 6, which is a sectional view of a wavenumber linearity optical system, the objective lens consists of multiple lenses. The objective lens 30 includes a first positive lens 31, a first negative lens 32, a second positive lens 33 and a third positive lens 34 that are sequentially arranged. The incident height and incident angle of the off-axis view field chief ray on the third positive lens 34 are increased to produce negative spherical aberration in order to introduce negative distortion. A second negative lens 35 is further provided at the side of the third positive lens 34 far away from the second positive lens 33 to correct the field curvature. The first positive lens 31, the first negative lens 32, the second positive lens 33, the third positive lens 34 and the second negative lens 35 are made of the same material to introduce longitudinal chromatic aberration. The first positive lens 34, the first negative lens 32, the second positive lens 33, the third positive lens 34 and the second negative lens 35 have a refractive index in the range of 1.5 to 2.3.

Fifth step: optimizing the objective lens based on the compensations for distortion and longitudinal chromatic aberration of the objective lens to obtain an optimized optical system, including: optimizing the optical system by changing the curvature of the objective lens, the interval between adjacent lenses, the thickness of the lens, and the material of the lens and obtaining values assigned to these variables through the least square method.

The technical solution of the present invention is to be further described below with a specific embodiment.

In this embodiment, the operating band of the wavenumber linearity spectrometer is 750 nm to 950 nm, the protective glasses on both sides of the transmissive grating 10 are BK7, the grating line pair number is 1200/mm, the material of the prism is ZnS, the size of the line detector is 20.4 mm, the size of the pixel is 10 μm×20 μm, and the spectral resolution is 0.1 nm. The equal-difference wavenumber samples are shown in Table 1.

TABLE 1

| Sample | 1 | 2 | 3 | 4 | 5 | 6 | 7 |
|---|---|---|---|---|---|---|---|
| Wavenumber/μm$^{-1}$ | 8.3776 | 8.2306 | 8.0836 | 7.9367 | 7.7897 | 7.6427 | 7.4957 |
| Wavelength/μm | 0.7500 | 0.7634 | 0.7773 | 0.7917 | 0.8066 | 0.8221 | 0.8382 |

| Sample | 8 | 9 | 10 | 11 | 12 | 13 |
|---|---|---|---|---|---|---|
| Wavenumber/μm$^{-1}$ | 7.3488 | 7.2018 | 7.0548 | 6.9078 | 6.7609 | 6.6139 |
| Wavelength/μm | 0.8550 | 0.8724 | 0.8906 | 0.9096 | 0.9293 | 0.9500 |

Figure 3:
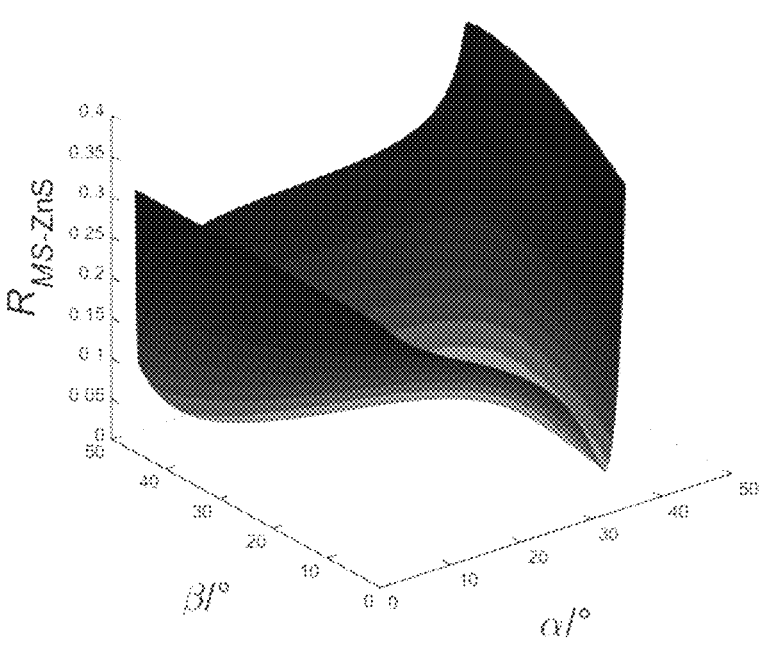
FIG. 3 shows a curve of the value $R_{MS}$ varying in function of $\beta$ and $\alpha$ when the prism is made of ZnS.
Figure 4:
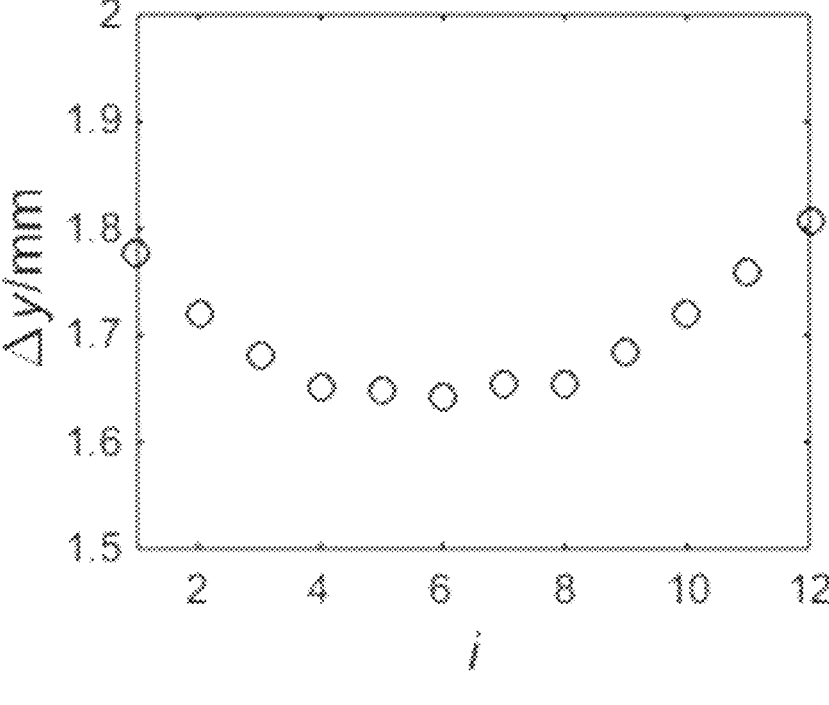
FIG. 4 is a schematic view of the location interval between adjacent wavenumbers prior to aberration compensation.

FIG. 3 shows the curves of $R_{MS}$ varying in function of $\beta$ and $\alpha$ according to the technical solution described above. As seen from the figure, $R_{MS}$ has the minimum value of 0.0094 when $\beta$ and $\alpha$ are respectively 26.9° and 37.7°. When $\beta$ is 0, i.e., when the grating adjoins the prism, $R_{MS}$ has the minimum value of 0.0539 when $\alpha$ is 32.0. FIG. 4 is a schematic view of the interval between adjacent wavenumbers prior to aberration compensation. FIG. 5 shows the curve of the image height varying in function of the wavenumber prior to aberration compensation. The wavenumber linearity of this optical system is about 6 times lower than the case where the grating is separated from the lens.

The grating adjoins the prism with a vertex angle of 32.0° to form an initial structure of the beam splitting element. The compensations for distortion and longitudinal chromatic aberration in the largest view field needed for the objective lens are estimated respectively as:

$$D = \frac{6 \times \frac{(\Delta y_{k_6} + \Delta y_{k_7})}{2} - \frac{(y_{k_1} + |y_{k_{13}}|)}{2}}{\frac{(y_{k_1} + |y_{k_{13}}|)}{2}},$$ (8)

$$C = y_{k_1} - |y_{k_{13}}|,$$ (9)

The corresponding objective lens is designed based on the estimated aberration to obtain an optimized wavenumber linearity spectrometer system. FIG. 6 is a schematic view of the optimized wavenumber linearity optical system. The collimated light exiting from the collimating lens 50 passes sequentially through the front protective glass of the grating 11, the grating 10 and the back protective glass of the grating 12 and enters the objective lens. The objective lens here includes a first positive lens 31, a first negative lens 32, a second positive lens 33, a third positive lens 34 and a second negative lens 35 that are sequentially arranged.

Figure 7:
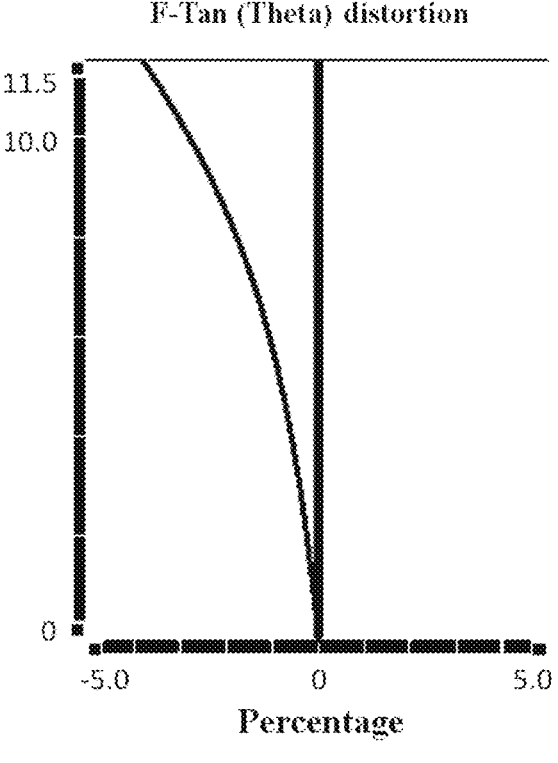
FIG. 7 is a schematic view showing distortion of an objective lens.
Figure 8:
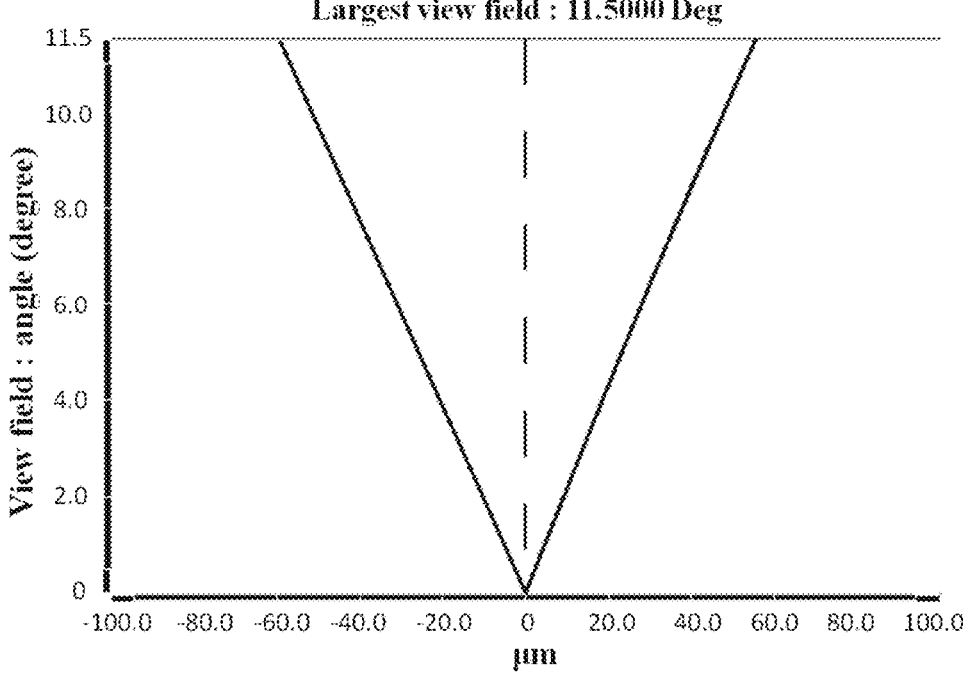
FIG. 8 shows curves of longitudinal chromatic aberrations for the wavelengths of 750 nm (on the left) and 950 nm (on the right)

FIG. 7 is a schematic view of objective lens distortion and FIG. 8 is a curve of longitudinal chromatic aberration. The maximum distortion is −3.74%, and the longitudinal chromatic aberration that can be produced in a largest view field is 113 μm.

Figure 9:
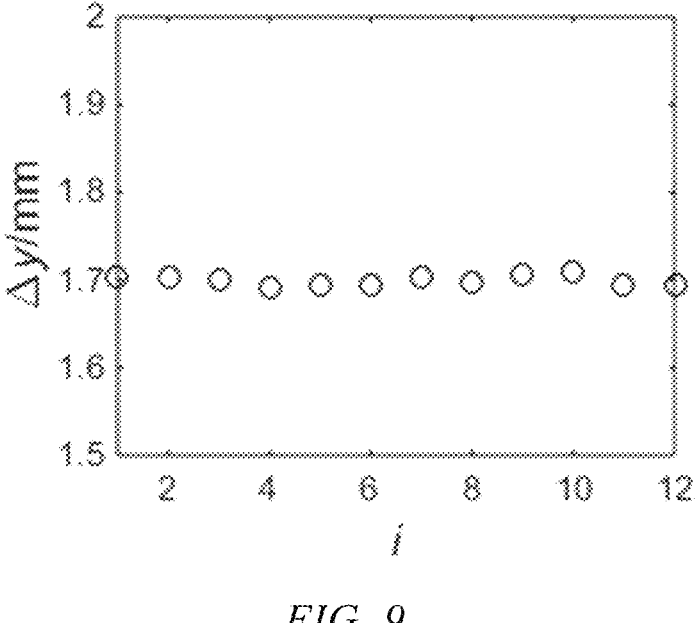
FIG. 9 is a schematic view of the interval between adjacent wavenumbers after aberration compensation.
Figure 10:
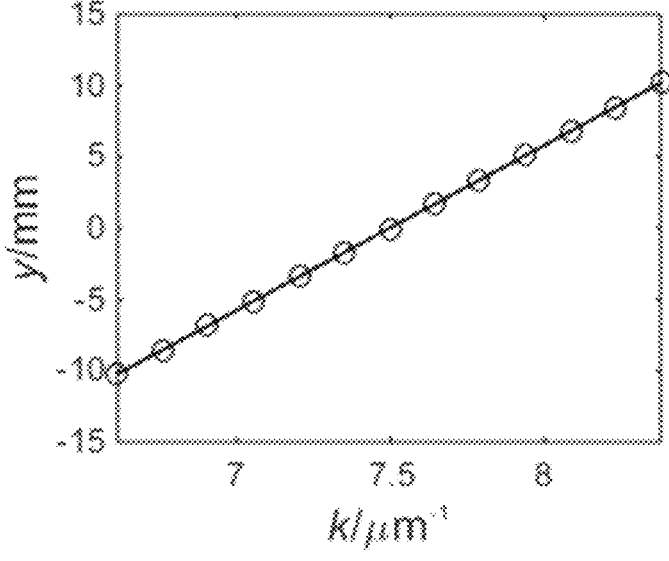
FIG. 10 is a curve of image height varying in function of the wavenumber after aberration compensation.

As shown in FIG. 9, which is a schematic view of the interval between adjacent wavenumbers after aberration compensation, and FIG. 10 shows a curve of the image height varying in function of the wavenumbers after aberration compensation in which the value $R_{MS}$ is 0.0056, the linearity is increased up to almost 10 times the original linearity and is better than the linearity when the grating is separated from the prism.

Figures 11, 12:
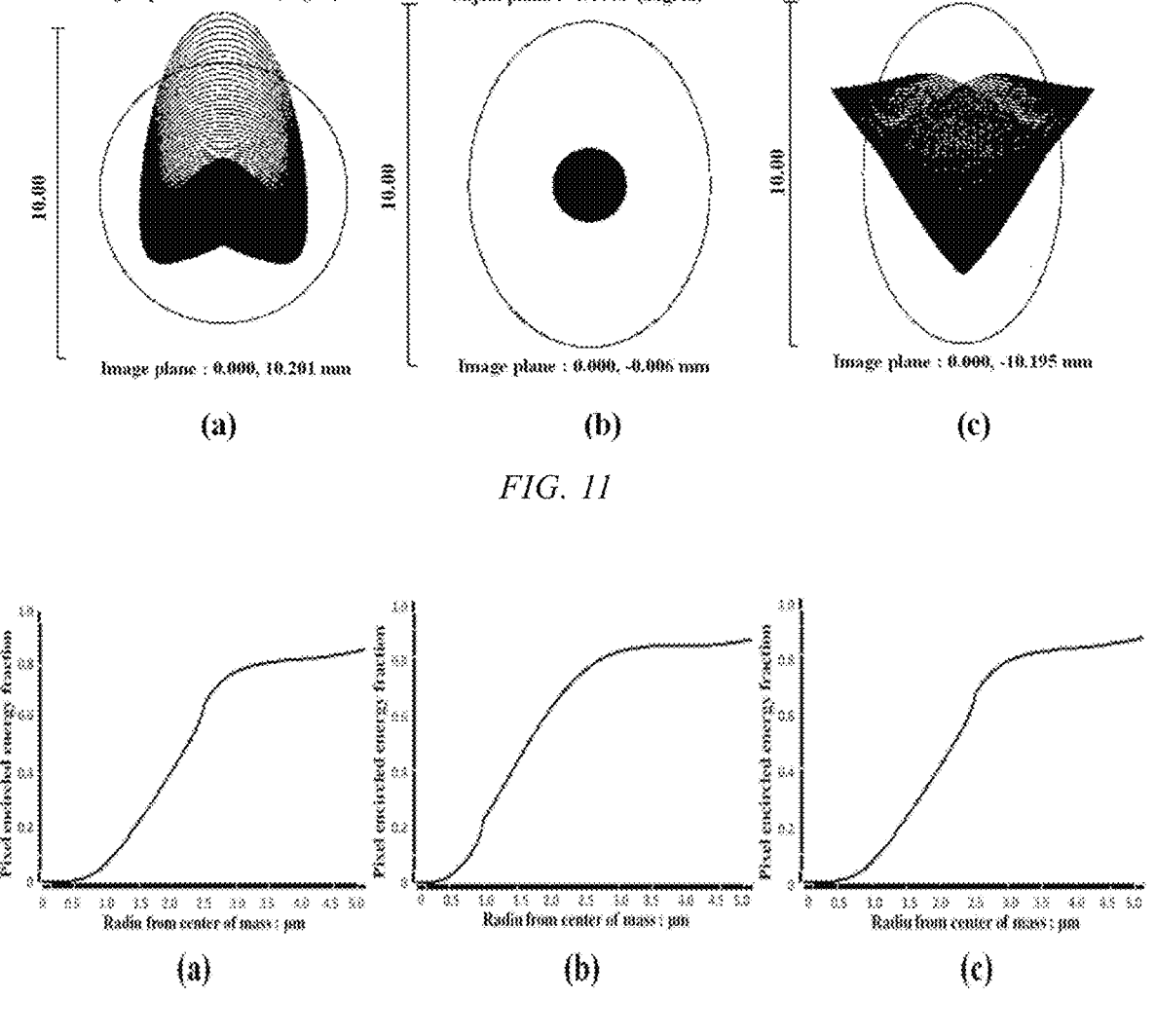
FIG. 11 shows spot diagrams for different wavelengths, in which (a) is the spot diagram for 750 nm, (b) is the spot diagram for 840 nm, and (c) is the spot diagram for 950 nm.
FIG. 12 shows the pixel encircled energy percentages, in which (a) shows the pixel encircled energy percentage for the wavelength of 750 nm, (b) shows the pixel encircled energy percentage for the wavelength of 840 nm, and (c) shows the pixel encircled energy percentage for the wavelength of 950 nm.

As shown in FIG. 11, which shows spot diagrams for different wavelengths, and FIG. 12 is a schematic view of pixel encircled energy percentages, all the spot diagrams stay are the Airy disk, indicating that this system has focusing properties of diffraction theory limit, and all the pixel encircled energy percentages are greater than 80%.

The above described embodiments are only preferred embodiments to fully illustrate the present invention, and the scope of protection of the present invention is not limited thereto. Any equivalent substitution or variation made by those skilled in the art on the basis of the present invention shall fall within the scope of protection of the present invention. The scope of protection of the present invention is defined by the claims.

What is claimed is:

1. A design method of a wavenumber linearity dispersion optical system, comprising steps of:

S1: building an optical system including a grating, a prism and an objective lens that are sequentially arranged, the grating adjoining the prism, wherein collimated light is split through the grating and the prism into rays of different wavenumbers, and the rays of different wavenumbers enter the objective lens at different angles and image on an image plane;

S2: defining a linearity evaluation coefficient RMS, which is the root-mean-square error of intervals between equal-difference wavenumbers in an operating band on the image plane;

S3: assuming a length of the image plane Y as a constant value, assigning a minimum value to the linearity evaluation coefficient RMS through adjustment to the vertex angle of the prism α, when the linearity evaluation coefficient RMS is at minimum, the vertex angle of the prism is $\alpha_1$;

S4: acquiring compensations for distortion and longitudinal chromatic aberration of the objective lens based on the interval between the equal-difference wavenumbers in the image plane when the vertex angle of the prism is $\alpha_1$; and S5: optimizing the objective lens based on the compensations for distortion and longitudinal chromatic aberration of the objective lens to obtain an optimized optical system.

2. The design method of a wavenumber linearity dispersion optical system of claim 1, wherein between the steps S4 and S5 the method further comprises designing an objective lens in which negative distortion and longitudinal chromatic aberration can be introduced.

3. The design method of a wavenumber linearity dispersion optical system of claim 2, wherein the objective lens includes a first positive lens, a first negative lens, a second positive lens and a third positive lens that are sequentially arranged, the incident height and incident angle of an off-axis view field chief ray on the third positive lens are increased to produce negative spherical aberration in order to introduce negative distortion.

4. The design method of a wavenumber linearity dispersion optical system of claim 3, wherein the second positive lens is located at a first side of the third positive lens, and a second negative lens is provided at a second side of the third positive lens to correct the field curvature.

5. The design method of a wavenumber linearity dispersion optical system of claim 4, wherein the first positive lens, the first negative lens, the second positive lens, the third positive lens and the second negative lens are made of the same material to introduce longitudinal chromatic aberration.

6. The design method of a wavenumber linearity dispersion optical system of claim 5, wherein the first positive lens, the first negative lens, the second positive lens, the third positive lens and the second negative lens have a refractive index in the range of 1.5 to 2.3.

7. The design method of a wavenumber linearity dispersion optical system of claim 5, wherein the step S5 comprises optimizing the optical system by changing the curvature of the objective lens, the interval between adjacent lenses, the thickness of the lens, and the material of the lens.

8. The design method of a wavenumber linearity dispersion optical system of claim 1, wherein the step S2 comprises steps of:

S21: selecting n equal-difference wavenumbers from the operating band;

S22: assuming the incident angle of a collimated ray on the grating as $\theta_{in}$, the diffraction angle as $\theta_d$, an included angle between the grating and the prism as β, a vertex angle of the prism as α, incident angles of the ray on the front and back surfaces of the prism respectively as $\theta_1$ and $\theta_3$ and the corresponding exit angles respectively as $\theta_2$ and θ, the refractive index of the prism as $n(\lambda)$, and an exit angle of the center wavenumber $k_{\frac{n+1}{2}}$

11 on the back surface of the prism as $$\theta_{k_{\frac{n+1}{2}}},$$

with its exit direction as the optical axis direction of the objective lens, and based on the geometrical relationship, the grating equation and the law of refraction, obtaining:

$$\sin\theta_2 = \frac{\sin\left[\beta + \arcsin\left(\frac{\lambda}{d} - \sin\theta_{in}\right)\right]}{n(\lambda)}, \quad (1)$$

$$\sin\theta = n(\lambda)\sin\theta_3, \quad (2)$$

where d is the grating constant, $\lambda=2\pi/k$ is the wavelength of the light, $\beta=\theta_1-\theta_d$, and $\theta_3=\alpha-\theta_2$;

S23: combining equation (1) with equation (2) and obtaining the exit angle of the ray on the back surface of the prism as:

$$\theta = \arcsin\left\{n(\lambda)\cdot\sin\left\{\alpha - \arcsin\left\{\frac{\sin\left\{\arcsin\left(\frac{\lambda}{d} - \sin\theta_{in}\right) + \beta\right\}}{n(\lambda)}\right\}\right\}\right\}; \quad (3)$$

and based on the paraxial relationship, obtaining a focal length of the objective lens as:

$$f = \frac{Y}{\left|\tan(\Delta\theta_{k_n})\right| + \left|\tan(\Delta\theta_{k_1})\right|}, \quad (4)$$

where Y is a length of the image plane, $$\Delta\theta_{kn} = \theta_{k_{\frac{n+1}{2}}} - \theta_{k_n}$$

12 is a view field angle at which the ray of wavenumber $k_n$ enters the objective lens, and $$\Delta\theta_{k_1} = \theta_{k_1} - \theta_{k_{\frac{n+1}{2}}}$$

is a view field angle at which the ray of wavenumber $k_1$ enters the objective lens; and S24: defining a linearity evaluation coefficient $R_{MS}$:

$$R_{MS} = \sqrt{\frac{\sum_{i=1}^{n}(\Delta y_{k_i} - \overline{y_k})^2}{n-1}}, \quad (5)$$

where $\Delta y_{k_i}=y_{k_i}-y_{k_{i+1}}$ is an interval between adjacent wavenumbers on the image plane, $y_{k_i}=f\cdot\tan(\Delta\theta_{k_i})$ is a y coordinate of the i-th wavenumber on the image plane, and $\overline{y_k}=(y_{k_i}-y_{k_i})/(n-1)$ is an average interval between equal-difference wavenumbers on the image plane.

9. The design method of a wavenumber linearity dispersion optical system of claim 8, wherein in the step S4, the compensation for distortion of the objective lens is $$D = \frac{\frac{n-1}{2} \times \frac{\left(\Delta y_{k_{\frac{n-1}{2}}} + \Delta y_{k_{\frac{n+1}{2}}}\right)}{2} - \frac{\left(y_{k_1} + |y_{k_n}|\right)}{2}}{\frac{\left(y_{k_1} + |y_{k_n}|\right)}{2}}, \text{ and}$$

the compensation for the longitudinal chromatic aberration of the objective lens is $C=y_{k_i}-|y_{k_i}|$.

10. An imaging spectrometer fabricated by the design method of a wavenumber linearity dispersion optical system of claim 1.

* * * * *